United States Patent [19]

Kamijo

[11] Patent Number: 4,819,891
[45] Date of Patent: Apr. 11, 1989

[54] MODE CHANGING MECHANISM IN TAPE RECORDER

[75] Inventor: Masao Kamijo, Tokyo, Japan

[73] Assignees: Kabushiki Kaisha Sankyo Seiki Seisakusho, Nagano; Tokyo Pigeon Co., Ltd., Tokyo, both of Japan

[21] Appl. No.: 183,131

[22] Filed: Apr. 19, 1988

[30] Foreign Application Priority Data

Sep. 24, 1987 [JP] Japan ............................. 62-237352

[51] Int. Cl.[4] .................................................. G11B 15/44
[52] U.S. Cl. ..................................... 242/201; 242/208; 360/96.4
[58] Field of Search .............................. 242/199–201, 242/206, 208, 209; 360/74.1, 96.3, 96.4

[56] References Cited

U.S. PATENT DOCUMENTS

| | | | |
|---|---|---|---|
| 4,528,606 | 2/1985 | Tsuchiya | 242/199 X |
| 4,563,711 | 1/1986 | Takai | 242/204 X |
| 4,604,662 | 8/1986 | Ida et al. | 360/74.1 |
| 4,698,706 | 10/1987 | Kilstofte | 242/200 X |
| 4,760,751 | 8/1988 | Kasamatsu | 242/201 X |

Primary Examiner—David Werner
Attorney, Agent, or Firm—Jones, Tullar & Cooper

[57] ABSTRACT

A mode changing mechanism of a tape recorder used in an automatic telephone answer apparatus. In order to omit a solenoid, a pinch roller is driven to or away from a capstan shaft upon a mode changing by a mechanism including a gear arm, gears and cam, etc. driven by a bidirectional motor.

3 Claims, 9 Drawing Sheets

MODE CHANGING MECHANISM IN TAPE RECORDER

FIELD OF THE INVENTION

This invention relates to a mode changing mechanism in a tape recorder used in an automatic telephone answer apparatus, etc.

BACKGROUND OF THE INVENTION

Most tape recorders for use in an automatic telephone answer apparatus are configured to be remotecontrolled by a user while he is out. In this connection, such a tape recorder includes an arrangement for changing modes electrically in such a manner that a magnetic head is moved to its recording and reproducing position directly by a solenoid itself or by an assist cam on an assist gear rotated by a solenoid in order to establish a recording and reproducing mode, whereas a rewinding mode is established by changing the rotating direction of a motor, while deenergizing the solenoid, i.e. not moving the magnetic head to the recording and reproducing position.

The use of a solenoid for this purpose invites a large power consumption which leads to a scale increase in a power source arrangement as well as an increase in the manufacturing cost, weight and scale of the entire apparatus, which necessarily limits the installment position of the apparatus.

OBJECT OF THE INVENTION

It is therefore an object of the invention to provide a mode changing mechanism not using a solenoid but using a bi-directional motor to control movements of a pinch roller to and away from a capstan shaft to establish a recording and reproducing mode or a rewinding mode, in order to decrease the power consumption, weight and manufacturing cost of its power source arrangement, and for the purpose of providing an automatic telephone answer apparatus having a less weight and scale than a prior art apparatus.

SUMMARY OF THE INVENTION

According to the invention, there is provided a mode changing mechanism of a tape recorder comprising:
 a motor rotatable in opposite directions;
 a flywheel driven by said motor and having a capstan shaft integrally formed therewith;
 a gear arm provided concentrically with said capstan shaft;
 gears provided at opposite ends of said gear arm and continuously engaging a capstan gear;
 a takeup reel gear and a supply reel gear selectively engaging said gears on said gear arm;
 an assist gear engageable with said capstan gear and having a cutout in which a circumferential gear train of the assist gear is interrupted;
 an engaging member formed on said assist gear to engage a projection formed on said gear arm;
 a member for moving a pinch roller to and away from said capstan shaft;
 an eccentric cam formed on said assist gear to drive said pinch roller moving member;
 said assist gear being engaged with said capstan gear by a trigger means in which said engaging member of said assist gear is pushed by said projection of said gear arm pivoted in the same direction as a selected rotating direction of said motor; and
 said eccentric cam being configured to drive said pinch roller moving member to move said pinch roller to or away from said capstan shaft when said assist gear is engaged with and driven by said capstan gear.

BRIEF DESCRIPTION OF THE DRAWINGS

FIGS. 1 through 5 show a first embodiment of the invention in which:FIG. 1 is a plan view of a mode changing mechanism in a recording and reproducing mode as seen through a chassis of a tape recorder; FIG. 2 is a fragmentary view of the same mechanism; FIG. 3 is a plan view of the same mechanism; FIG. 4 is a plan view of the mode changing mechanism in a rewinding mode as seen through the chassis of the tape recorder; and FIG. 5 is a plan view of the same mechanism, and FIGS. 6 through 11 show a second embodiment of the invention in which:FIG. 6 is a plan view of a mode changing mechanism in a recording or reproducing mode as seen through the chassis of the tape recorder; FIG. 7 is a plan view of the same mechanism; FIG. 8 is a perspective view of a pinch arm; FIG. 9 is a plan view of the same mechanism in a rewinding mode as seen through the chassis of the tape recorder; FIG. 10 is a plan view of the same mechanism; and FIG. 11 is an exploded perspective view of the same mechanism.

DETAILED DESCRIPTION

Figure 1:
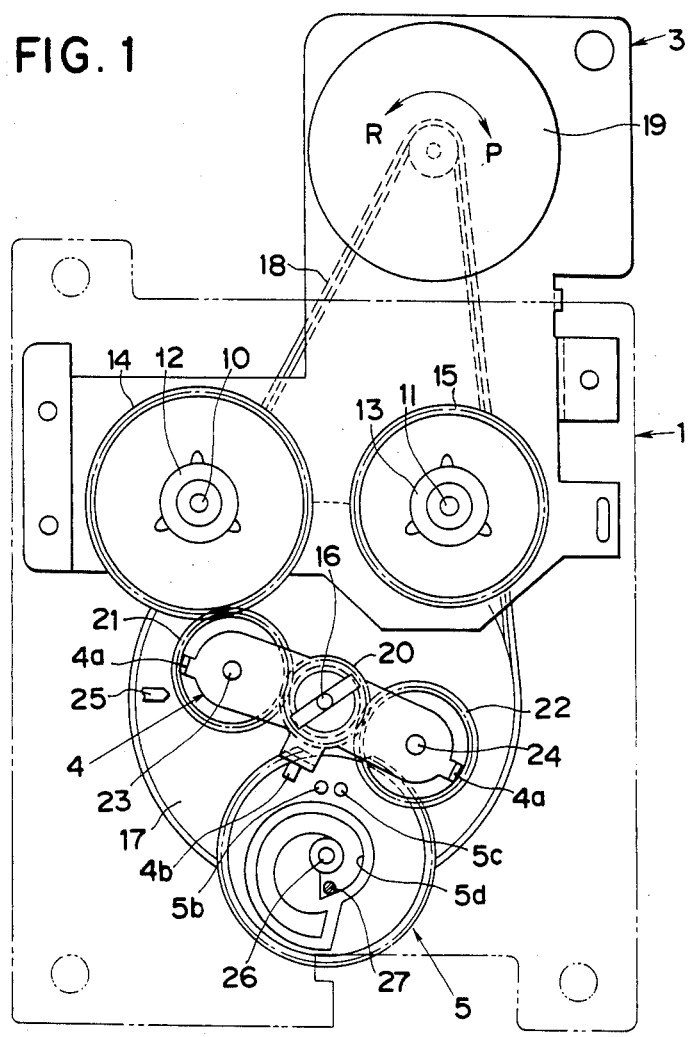

The invention is described below, referring to preferred embodiments illustrated in the drawings. FIGS. 1 through 5 show a first embodiment of the invention which is a tape recorder configured to move a head plate ahead to bring a pinch roller into close contact with a capstan shaft. A mode changing mechanism for changing modes of the tape player takes a recording or reproducing mode in a plan view of FIG. 1 as seen through a chassis 1 and a head plate 2, a fragmentary view of FIG. 2 and a plan view of FIG. 3. On a lower chassis 3 are secured reel shafts 10 and 11 which rotatably support a tape takeup reel base 12 and a tape supply reel base 13 respectively. The reel bases 12 and 13 are conjoined with a takeup reel gear 14 and a supply reel gear 15 respectively via friction arrangements. The chassis 1 rotatably supports a flywheel 17 having a capstan shaft 16 extending upwardly therefrom through the head plate 2. The flywheel 17 has a circumferential groove accepting a belt 18 therein to be driven by a bidirectional motor 19 via the belt 18.

The capstan shaft 16 supports a capstan gear 20 rotatably and supports a gear arm 4 via a friction arrangement pivotably in the rotating direction thereof. At opposite sides of the gear arm 4 are supported gears 21 and 22 by pivot shafts 23 and 24 for continuous engagement with the capstan gear 20. A friction arrangement is interposed between one of the gears, i.e. the gear 21 and the associated pivot shaft 23. A projection 25 is provided on the chassis 1 in a location partly overlapping the movable range of the gear 21. The projection 25 has a tooth-like configuration for engagement with the gear 21 when the latter is pivoted by the gear arm 4. At opposite ends of the gear arm 4 are provided upstanding portions 4a—4a inserted in holes (not shown) of the chassis 1 to limit the pivotal movement of the gear arm 4. A projection 4b extends from a central portion of the gear arm 4.

A downwardly extending shaft 26 is secured to the lower face of the chassis 1 to pivotably support an assist gear 5 which is engageable with the capstan gear 20.

The assist gear 5 has a cutout 5a interrupting its gear train along its circumferential margin and includes trigger engaging members in the form of pins 5b and 5c which slidably contact a pin 27 extending downwardly from the lower face of the head plate 2 through an elongated hole 1a of the chassis 1.

The head plate 2 carries thereon a recording/reproducing head 28 and an erasing head 29, and is provided with a shaft 31 pivotably supporting a pinch arm 30 and a tape guide 32 located in a left-hand portion thereof. The pinch arm 30 pivotably supports a pinch roller 33 and cooperates with the head plate 2 to form an arrangement for moving the pinch roller 33 to and away from the capstan shaft 16. The pinch roller 33 is biased into close contact with the capstan shaft 16 by a spring 34 fixed to the shaft 31. Guide pins 35-35 are secured on the chassis 1 to define positions of a tape cassette 36.

Figure 2:
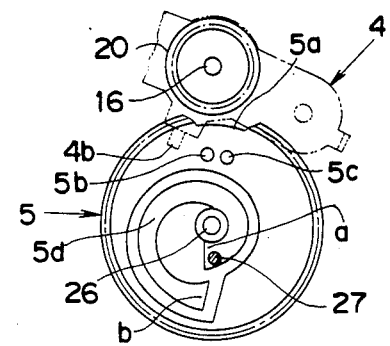
Figure 3:
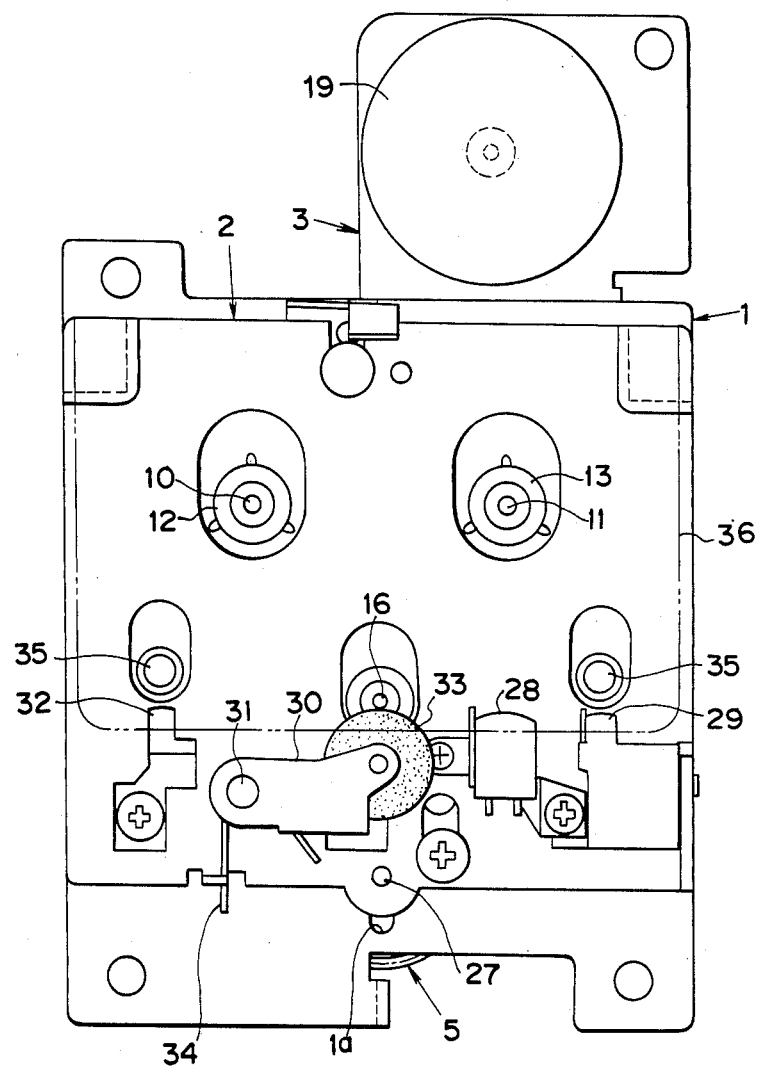

In the recording or reproducing mode of FIGS. 1 through 3, the flywheel 17 is rotated clockwisely under a rotation of the motor 19 in arrow P direction to pivot the gear arm 4 clockwisely so that the gear 21 in continuous engagement with the capstan gear 20 also engages the takeup reel gear 14.

In this condition, the cutout 5a of the assist gear 5 is opposed to the capstan gear 20. The pin 27 secured to the head support board 2 is positioned at an inner end a of a groove of an eccentric cam 5d to hold the head plate 2 in its advanced position where the pinch roller 33 closely contacts the capstan shaft 16 to closely sandwich the tape which is fed from the tape cassette 36 to the tape takeup reel base 12 at a constant speed. The projection 4b of the gear arm 4 is positioned in a left-hand portion of the trigger pin 5b.

When the tape recorder is changed to the rewinding mode, the rotating direction of the motor 19 is changed to the counterclockwise direction shown by arrow R in the drawings. Responsively, the flywheel 17 is rotated in the counterclockwise direction, and the gear arm 4 is pivoted back simultaneously. During this pivotal movement, the gear 21 engages the projection 25. Since the friction arrangement is provided between the gear 21 and the shaft 23, as far as the gear 21 is rotated, a large pivotal force is applied to the gear arm 4 to reliably rotate it. Further, the trigger pin 5b urges the projection 4b during the pivotal movement of the gear arm 4 so that this trigger means rotates the assist gear 5 clockwisely into engagement with the capstan gear 20 which subsequently rotates the assist gear 5 about a full revolution until the cutout 5a of the assist gear 5 is opposed to the capstan gear 20.

Figure 4:
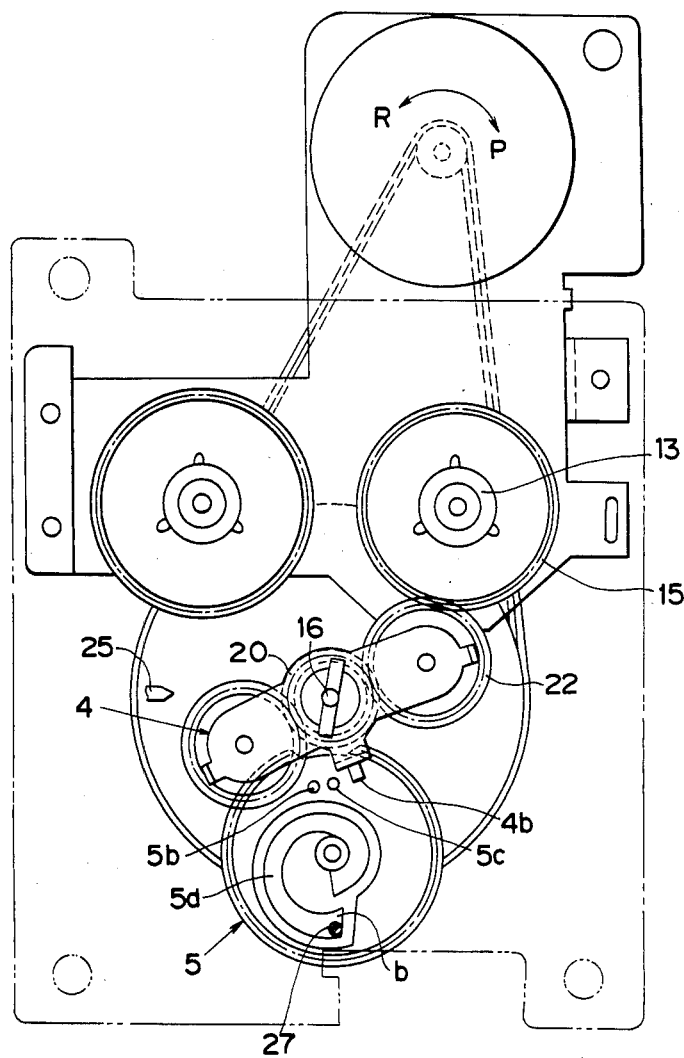

As a result, the assist gear 5 stops, and the rewinding mode of FIG. 4 is established.

Figure 5:
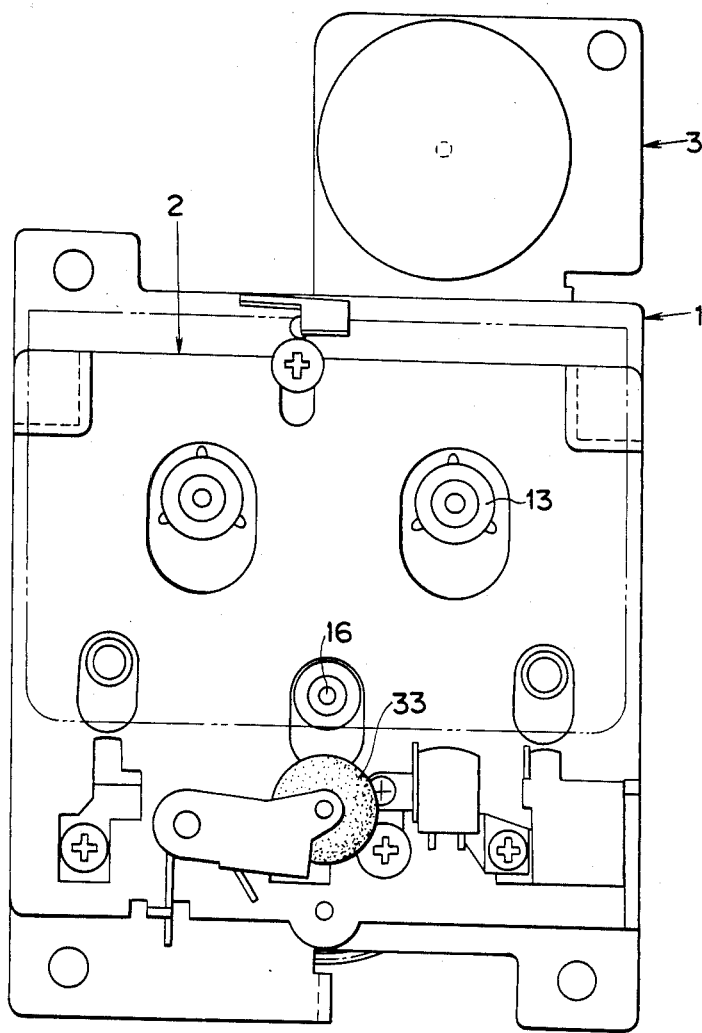

In the rewinding mode, the gear 22 in continuous engagement with the capstan gear 20 also engages the supply reel gear 15, and the pin 27 is positioned at an outer end b of the groove of the eccentric cam 5d. The head plate 2 is withdrawn as shown in FIG. 5 to detach the pinch roller 33 from the capstan shaft 16. The tape is fed back to the tape supply reel base 13 at a high speed. The projection 4b of the gear arm 4 is located in the right of the trigger pin 5c.

When the tape recorder is changed to the recording and reproducing mode, the flywheel 17 is rotated clockwisely to rotate back the gear arm 4 clockwisely. As a result, the projection 4b urges the trigger pin 5c to rotate the assist gear 5 into engagement with the capstan gear 20 which subsequently rotates about one revolution to establish the recording and reproducing mode of FIG. 1.

FIGS. 6 through 11 show a second embodiment of the invention which is a tape recorder in which a head plate 6 is mounted on a resin-molded chassis 7 so that an operator can put a finger on an upstanding portion 6a to manually retract the head plate 6 only upon loading or unloading a tape cassette and in which a pinch arm 8 is moved back and forth by an eccentric cam of an assist gear 9 to bring the pinch roller into close contact with the capstan shaft.

Figure 6:
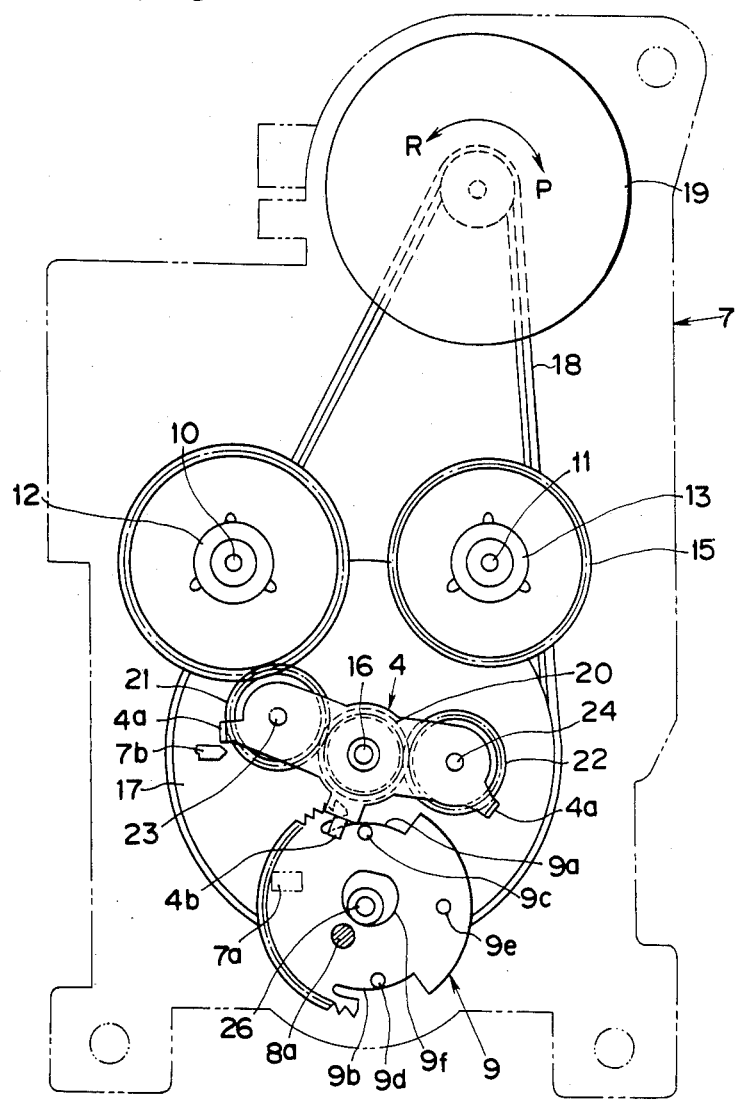
Figure 7:
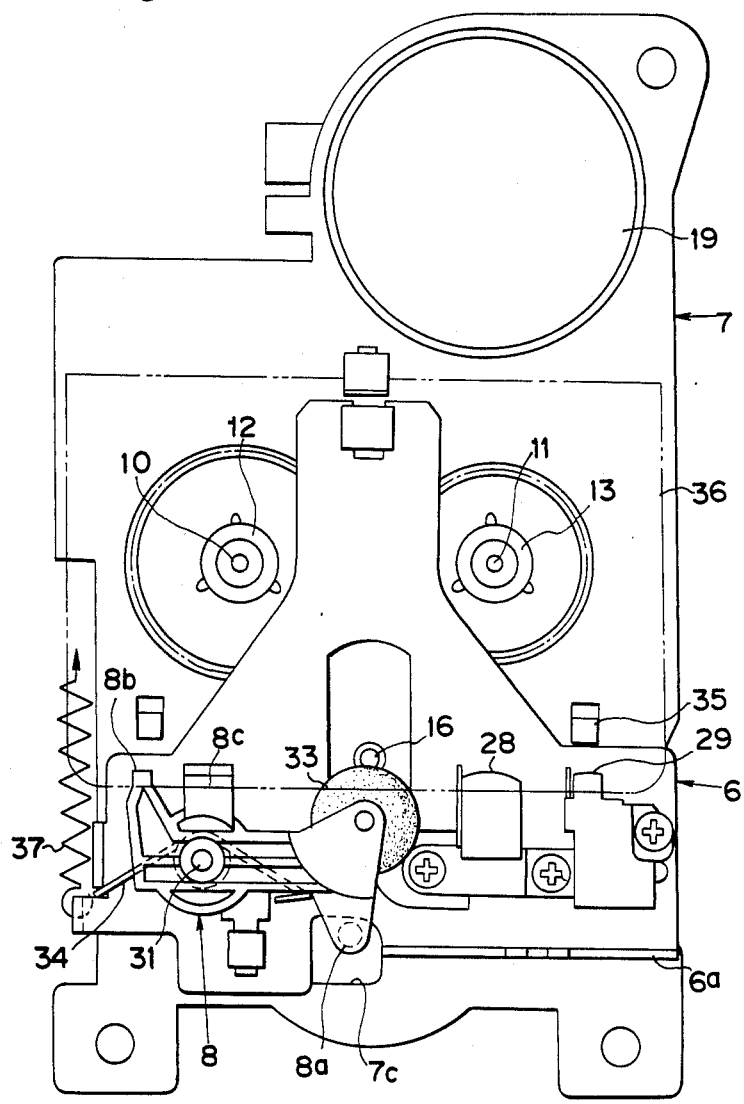

FIG. 6 is a plan view of the mode changing mechanism as seen through the chassis 7 and the head plate 6 whereas FIG. 7 is a plan view also showing the chassis 7 and the head plate 6. Both drawings show the recording and reproducing mode of the mechanism. The second embodiment is different from the first embodiment in arrangements of chassis 7, head plate 6, pinch arm 8 and assist gear 9 but is substantially identical to same in the remainder. The chassis 7 is provided with upstanding secured reel shafts 10 and 11 which rotatably support the tape takeup reel base 12 and the tape supply reel base 13. The chassis 7 rotatably supports the flywheel 17 which includes the capstan shaft 16 integrally formed therewith.

The chassis 7 is also provided with a downwardly extending secured shaft 26 which support the assist gear 9 for engagement with the capstan gear 20. The chassis 7 includes a projection 7b at the same position as that of the projection 25 in the first embodiment.

The assist gear 9 has non-toothed cutouts 9a and 9b along the circumferential margin thereof, and includes short trigger pins 9c-9d to be pushed by the projection 4b of the gear arm 4 and a long stopper pin 9e for engaging the downward projection 7a of the chassis which extend upwardly at positions radially inward of the cutouts 9a and 9b. The assist gear 9 further includes an eccentric cam 9f.

Figure 8:
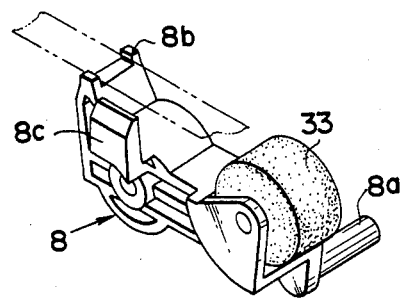

The head plate 6 is continuously biased forwardly by a spring 37. The head plate 6 has a fixed shaft 31 which pivotably supports the recording and reproducing head 28, erasing head 29 and pinch arm 8. The pinch arm 8 pivotably supports a pinch roller 33 to move same to and away from the capstan shaft 16. The pinch roller 33 is biased in a direction for close contact with the capstan shaft 16 by a spring 34 fixed on the shaft 31. The pinch arm 8 includes a pin 8a which passes through a through hole 7c of the chassis 7 and slidably contacts the eccentric cam 9f. As best shown in FIG. 8, the pinch arm 8 includes a cassette stopper 8c so that the tape cassette 36 cannot be loaded unless the head plate 6 is fully retracted manually.

The second embodiment operates similarly as the first embodiment. In the recording and reproducing mode of FIGS. 6 and 7, the flywheel 17 is rotated clockwisely by the motor 19 to pivot the gear arm 4 clockwisely so that the gear 21 in continuous engagement with the capstan gear 20 also engages the takeup reel gear 14.

In this configuration, one of the cutouts, i.e. 9a, for example, of the assist gear 9 is opposed to the capstan gear 20, and the pin 8a of the pinch arm 8 is moved away from the eccentric cam 9f and moved forwardly by the spring 34. The pinch roller 33 is brought in close contact with the capstan shaft 16 to closely sandwich the tape, and the tape is driven at a constant speed toward the tape takeup reel base 12. The projection 4b of the gear arm 4 is positioned in the left of the trigger pin 9c.

When the mechanism is changed to the rewinding mode, the motor 19 is rotated counterclockwisely to rotate the flywheel wheel 17 and the gear arm 4 counterclockwisely. Responsively, the projection 4b urges the trigger pin 9c so that the trigger means pivots the assist gear 9 clockwisely. Subsequently, the assist gear 9 engages the capstan gear 20 and is rotated thereby by a half revolution until the other cutout 9b is opposed to the capstan gear 20 where the assist gear 9 is disengaged from the capstan gear 20 and stops its rotation. In this configuration, the spring 34 of the pinch arm 8 applies a clockwise pivotal force to the eccentric cam 9f via the pin 8a. However, since the stopper pin 9e engages the projection 7a, the assist gear 9 is held unrotatable to establish the rewinding mode of FIGS. 9 and 10.

Figure 10:
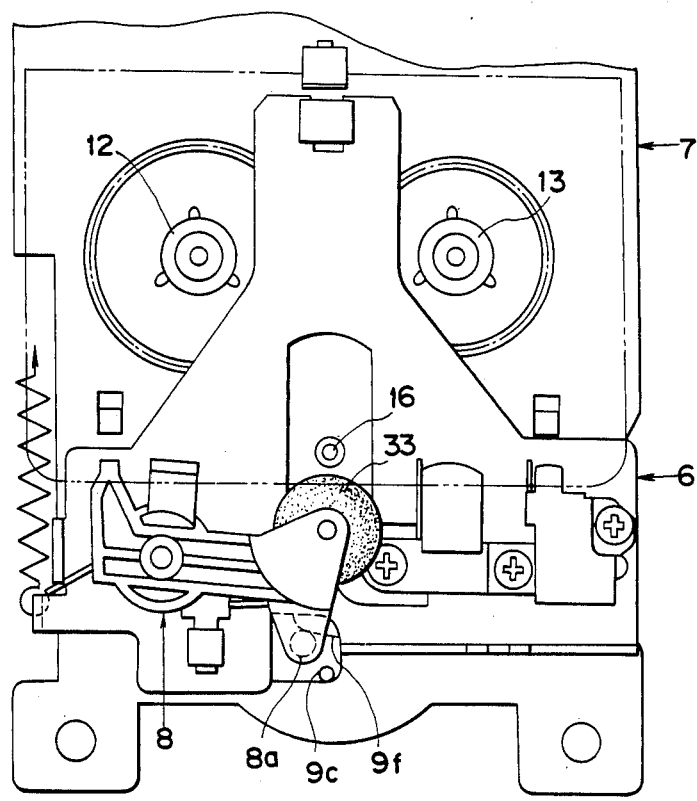
Figure 9:
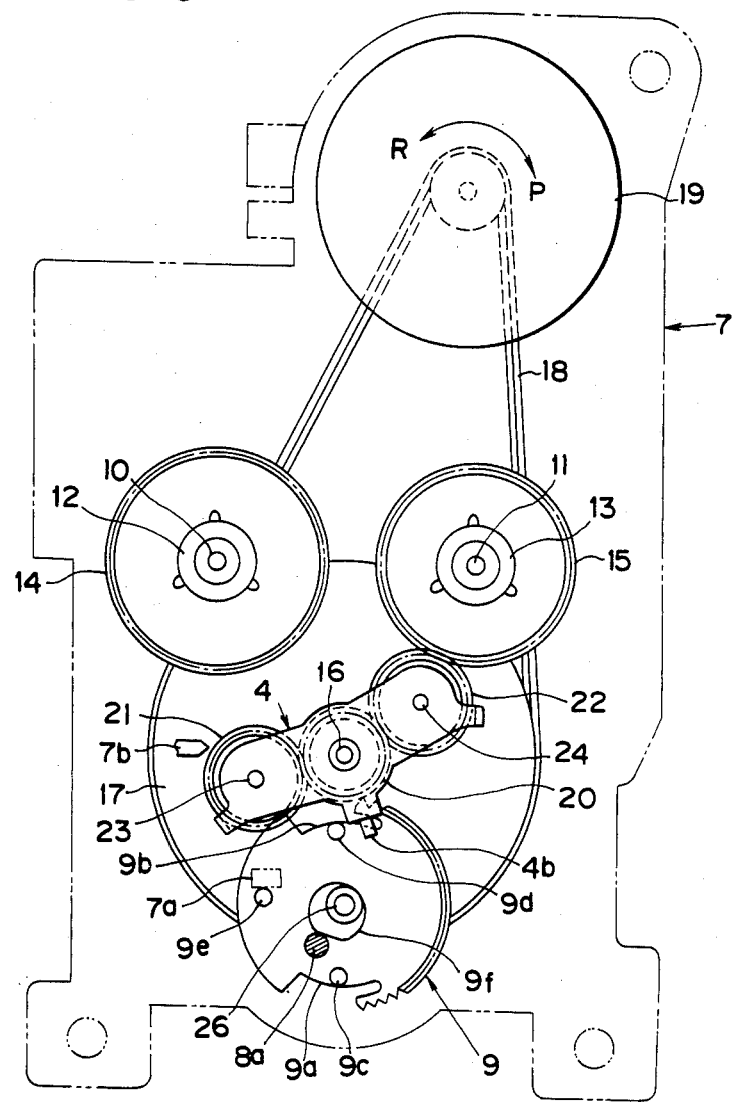
Figure 11:
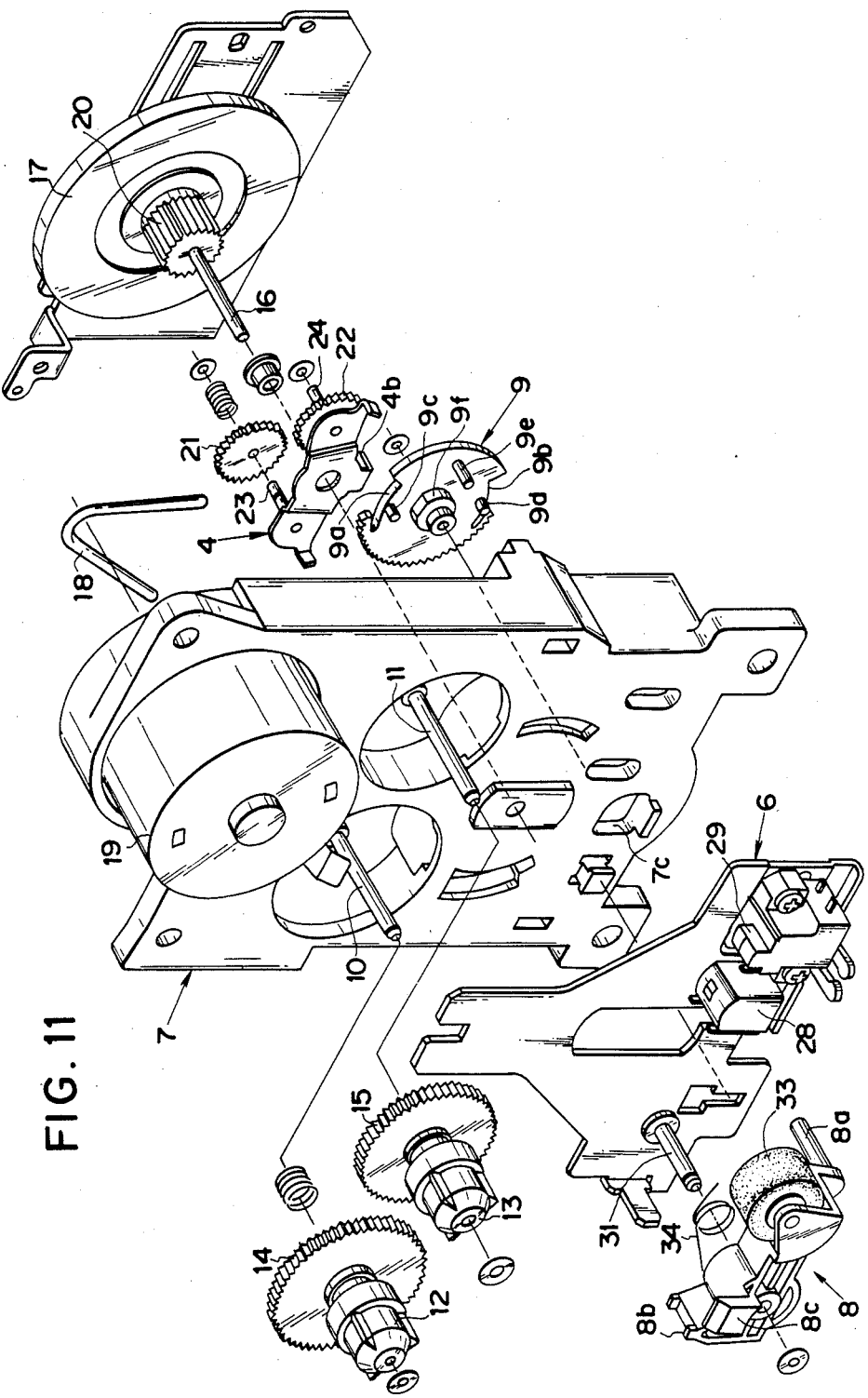

When the mechanism is changed to the rewinding mode, the pinch arm 8 is pivoted by the eccentric cam 9f pushing the pin 8a, the pinch roller 33 is retracted away from the capstan shaft 16 as shown in FIG. 10, and the tape is fed back toward the tape supply reel base 13 at a high speed. The projection 4b of the gear arm 4 is positioned in the right of the trigger pin 9d.

When the mechanism is changed to the recording and reproducing mode, the flywheel 17 is rotated clockwisely to pivot the gear arm 4 clockwisely. Responsively, the projection 4b urges the trigger pin 9d to bring the assist gear 9 into engagement with the capstan gear 20. The assist gear 9 is subsequently rotated by a half revolution to establish the recording and reproducing mode of FIG. 6.

When the mode changing mechanism is used in a tape recorder of an automatic telephone answer apparatus, it repeats the following processes.

---

A telephone call is received.
↓
An answer is announced, using a voice composition IC, etc.
↓
A motor is driven to record a message.
↓
The line is cut off.
↓
The motor stops.
↓
The system is on standby for a next call.

---

When reproducing telephone messages, the mechanism is operated as follows:

---

The automatic answering mode is cancelled.
↓
The motor is rotated to rewind the tape up to a starting position.
↓
The motor is rotated to reproduce the messages.
↓
Upon finishing the reproduction, the motor is rotated to rewind the tape and erase the messages.

↓
The motor is stopped and held on standby for a next use.

---

The use of the tape guide 8b of the pinch arm 8 permits omission of the fixed tape guide 32 in the first embodiment, which contributes to a reduction of parts of the mechanism and facilitates the assembling process. Beside this, since the tape guide 8b is inserted in the tape cassette more deeply in the rewinding mode than in the recording and reproducing mode, the tape guide 8b prevents a large vertical fluctuation of the tape during a high speed travel of the tape in the rewinding mode and hence ensures a reliable erasure by the erasing head.

As described above, the inventive arrangement can control movements of the pinch roller to and away from the capstan shaft without using a solenoid. Therefore, it saves the power consumption and reduces the size, weight and manufacturing cost of the power source arrangement.

What is claimed is:

1. A mode changing mechanism of a tape recorder comprising:
   a motor rotatable in opposite directions;
   a flywheel driven by said motor and having a capstan shaft integrally formed therewith;
   a gear arm provided concentrically with said capstan shaft;
   gears provided at opposite ends of said gear arm and continuously engaging a capstan gear;
   a takeup reel gear and a supply reel gear selectively engaging said gears on said gear arm;
   an assist gear engageable with said capstan gear and having a cutout in which a circumferential gear train of the assist gear is interrupted;
   an engaging member formed on said assist gear to engage a projection formed on said gear arm;
   a member for moving a pinch roller to and away from said capstan shaft;
   an eccentric cam formed on said assist gear to drive said pinch roller moving member;
   said assist gear being engaged with said capstan gear by a trigger means in which said engaging member of said assist gear is pushed by said projection of said gear arm pivoted in the same direction as a selected rotating direction of said motor; and
   said eccentric cam being configured to drive said pinch roller moving member to move said pinch roller to or away from said capstan shaft when said assist gear is engaged with and driven by said capstan gear.

2. A mode changing mechanism of a tape recorder according to claim 1 wherein said pinch roller moving member is a pin of a pinch arm supporting said pinch roller.

3. A mode changing mechanisms of a tape recorder according to claim 1 wherein said pinch roller moving member is a pin of a head plate rotatably supporting said pinch roller.

* * * * *